Aug. 11, 1970          L. W. MACK          3,524,031
FLUID ACCELERATION SWITCH
Filed May 22, 1968
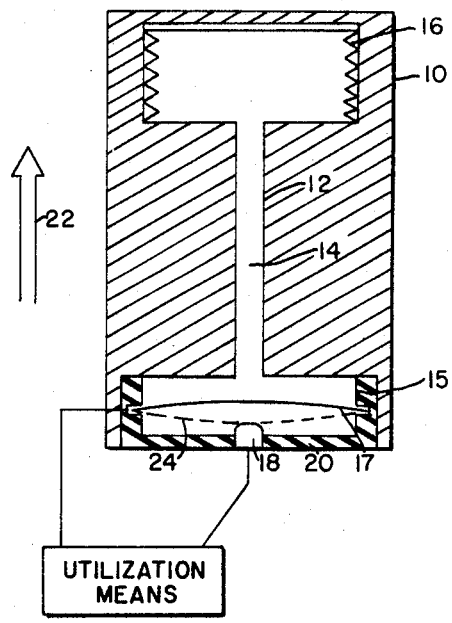
FIG. 1
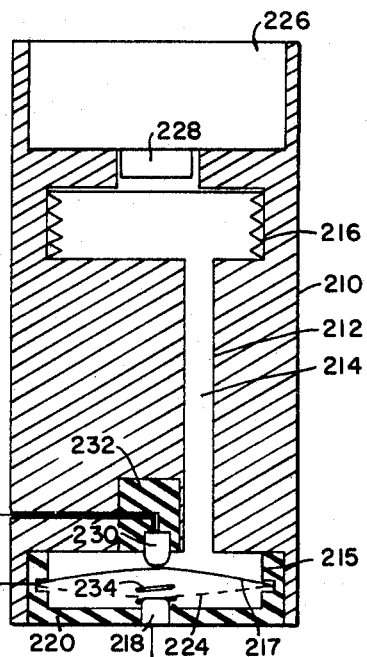
FIG. 2
INVENTOR
LEON W. MACK
BY
ATTORNEY United States Patent Office 3,524,031
Patented Aug. 11, 1970

3,524,031
FLUID ACCELERATION SWITCH
Leon W. Mack, Amherst, N.H., assignor to Sanders Associates, Inc., Nashua, N.H., a corporation of Delaware
Filed May 22, 1968, Ser. No. 731,084
Int. Cl. H01h 35/14
U.S. Cl. 200—61.53
15 Claims

ABSTRACT OF THE DISCLOSURE

A fluid acceleration switch is provided in which a column of fluid is acted upon by an applied linear acceleration and produces a pressure on a collapsible diaphragm. Upon reaching a critical pressure, corresponding to a predetermined acceleration, the convex diaphragm collapses, causing the actuation of an electrical switch.

FIELD OF THE INVENTION

The present invention relates to electrical switches and, more particularly, to an electrical switch which is operable by inertial forces exerted along the longitudinal axis thereof.

DESCRIPTION OF THE PRIOR ACT

In the field of acceleration switches, the damped spring-mass system has found wide application. In this type of switch, a movable seismic mass is positioned relative to a fixed contact using a spring member, whereby linear acceleration forces acting along the longitudinal axis of the movable mass will give rise to compression of the spring. An acceleration force of a predetermined level will cause the movable mass to close an electrical circuit with the fixed contact.

Damped spring-mass systems unfortunately suffer from the disadvantage that when they are fabricated such as to be sensitive to low acceleration levels their susceptibility to vibration is high; i.e., the switch may be actuated by vibrations. Spring-mass switches which are made to be insensitive to vibration are as a result also insensitive to low acceleration levels. Another limitation of spring-mass type switches is that their resonant frequencies are typically low (in the low audio). In missile applications, the acoustic frequency vibration environment is particularly severe; however, there remains a requirement for electrical switching based upon low acceleration levels.

SUMMARY AND OBJECTS OF THE INVENTION

In carrying out the present invention, the limitations and disadvantages of the prior art are overcome by providing a linear acceleration switch utilizing fluid pressure rather than the conventional seismic mass to respond to applied acceleration. Linear acceleration, acting longitudinally along the length of a fluid column, produces a pressure on the convex surface of an electrically conductive diaphragm which is exposed to the fluid pressure. The mechanical characteristics of the diaphragm are selected such that upon reaching a critical pressure corresponding to a predetermined acceleration, the convex surface will invert or collapse and come in electrical contact with a fixed contact pin. The pressure developed on the diaphragm is dependent upon the length of the column of fluid, rather than on its total mass. This fact permits the fabrication of an acceleration switch having a high natural frequency, yet being responsive to low acceleration levels.

It is therefore a primary object of the present invention to provide a new and novel linear acceleration switch wherein acceleration forces act upon a column of fluid to develop pressure on a collapsible diaphragm.

It is an additional object of the present invention to provide a switch of the above-described character having a high natural frequency.

It is another object of the present invention to provide a switch of the above-described character which is responsive to low acceleration levels.

It is a further object of the present invention to provide an improved latching type linear acceleration switch.

It is still another object of the present invention to provide a linear acceleration switch having a provision for built-in testing.

It is yet an additional object of the present invention to provide a switch of the above-described character having a single pole double-throw action.

These and other objects, features, and advantages of the present invention will become more apparent from the detailed discussion considered in conjunction with the accompanying drawings. The scope of the invention will be indicated in the claims.

BRIEF DESCRIPTION OF THE DRAWINGS

FIG. 1 is a cross-sectional view of one embodiment of the present invention.

FIG. 2 is a cross-sectional view of an alternative embodiment of the present invention.

DESCRIPTION OF THE PREFERRED EMBODIMENT

Referring now to FIG. 1, there is thereby illustrated an embodiment of the present invention. A housing 10 forms a tubular passage 12 which is filled with a fluid 14. An expansion bellows 16 or other suitable variable volume fluid supply means, which is also filled with the fluid 14 is disposed at the forward end of, and forms a contiguous sealed chamber with the passage 12 to thereby prevent the formation of a vacuum at the forward end of the passage. The trailing end of the passage 12 terminates in a reservoir 15, having rigid side walls formed of the container 10 and capped by a convex shaped electrically conductive metallic diaphragm 17. An electrical contact pin 18 is mounted so as to be electrically isolated from the container 10 by dielectric material 20.

In operation, when the switch shown in FIG. 1 experiences an acceleration in the direction shown by the arrow 22; i.e., along the longitudinal axis of the passage 12 acceleration forces acting in the opposite direction produce fluid pressure on the diaphragm 17. This pressure is directly proportional to the column length, the density of the fluid 14, and the level of the applied acceleration. When the fluid pressure reaches a predetermined critical level, the diaphragm 17 collapses to a concave position 24, thus making electrical contact with the pin 18.

It will be noted that the fluid pressure developed on the diaphragm 17 is dependent upon the length of the fluid column as measured from the forward end of the expansion bellows 16 to the peak of the diaphragm 17 while in the normally uncollapsed or convex position. The fact that this pressure is independent of the total mass of the fluid permits the realization of a linear acceleration switch, having a high natural frequency and simultaneously being responsive to low acceleration levels.

For the purpose of illustration, specific elements have been identified which may be used to advantage in the practice of the present invention. An acceleration switch of the type illustrated in FIG. 1 was fabricated, having a column length of 2.45 inches, which was filled with a high density oil such as Kel-F #10 which is commercially available from the M. W. Kellogg Company. Mercury is another fluid which is adaptable for use in the practice of the invention provided the temperature environment in which the switch is used does not drop below that at which this element solidifies. The diaphragm 17 was fabricated from beryllium copper 1.50 inches in diameter, .0032 inch thick, and having a radius of curvature of 4.73 inches. This switch was found by the applicant to have a critical fluid pressure of 2.02 pounds per square inch, which corresponded to an applied acceleration of 386.4 feet per second per second (12 G's). It is herein to be noted that the foregoing materials and dimensions are presented solely for the purposes of illustration and are not in any way to be considered as being of a limiting nature.

It will be evident that the present invention provides a linear acceleration switch of simple, inexpensive and highly reliable construction which is readily adaptable for use in such applications as for example, a safety and arming device for explosive ordinance wherein a warhead must be maintained in a safe condition until such time as it has been accelerated a safe distance from friendly personnel. The apparatus of the present invention may also be merely reversed in its orientation and used as an impact switch to sense deceleration and activate an explosive charge.

Turning now to FIG. 2, there is illustrated a more sophisticated embodiment of the present invention whereby a single-pole, double-throw switching action is provided. As described above, a housing 210 contains a tubular passage 212 connected at one end to an expansion bellows 216 and at the other to a reservoir 215 all of which are substantially filled with fluid 214. An electrically conductive metallic diaphragm 217, having a convex configuration again caps the reservoir 215. A first electrical contact 218 is mounted in dielectric material 220 in electrical isolation from the container 210. A second electrical contact 230 is mounted in dielectric material 232 such that when the diaphragm 217 is in its normally convex position, electrical contact is made between the contact 230 and the diaphragm 217.

When under the influence of acceleration along the axis of the passage 212, fluid pressure is developed on the diaphragm 217 in the above-described manner. When this pressure reaches a predetermined critical level, the diaphragm 217 collapses to a concave position 224 opening the electrical circuit with the contact 230 and closing a circuit with contact 218.

A return spring 234 may also be provided whereby the diaphragm 217 may be returned to its normally convex position when the acceleration force is reduced below the critical level.

Also illustrated in FIG. 2 is a self-test feature of the present invention. Provision is made in the forward end of the container 210 for mounting a solenoid 226, the plunger of which is constructed so that for a given applied voltage through the solenoid coil, the plunger 228 will move outwardly with a known force. The solenoid 226 is disposed relative to the expansion bellows 216 such that when the solenoid is activated, the plunger 228 engages the forward end of the bellows with a preselected force simulating an applied acceleration force and creating a fluid pressure on the diaphragm 217 sufficient to invert the diaphragm, actuating the switch.

This embodiment of the present invention may, for example, be readily adapted for use in propulsion system control apparatus for multistage rockets. Upon reaching a preselected acceleration level with the first stage of a rocket engine the diaphragm inverts closing a circuit activating the shut-off of the first stage. When the first stage shut-off is accomplished, the rocket begins to decelerate, thus reducing the fluid pressure on the diaphragm. The return spring then pushes the diaphragm to its original position to close a circuit actuating the ignition of a second stage.

It will thus be seen that the objects set forth above, among those made apparent from the preceeding description, are efficiently attained and, since certain changes may be made in the above construction without departing from the scope of the invention, it is intended that all matter contained in the above description or shown in the accompanying drawings shall be interpreted as illustrative and not in a limiting sense.

Having described what is new and novel, and desired to secure by Letters Patent, what is claimed is:

1. A linear acceleration switch comprising
a sealed fluid filled tubular member,
an electrically conductive collapsible diaphragm closing one end of said tubular member, and
an electrical contact disposed in a fixed position relative to said diaphragm such that said diaphragm when collapsed engages said contact,
whereby acceleration forces of a predetermined magnitude acting on said switch along the longitudinal axis of said tubular member cause sufficient fluid pressure to collapse said diaphragm such that said contact is engaged thereby.

2. Apparatus as recited in claim 1 further including
a variable volume fluid supply means disposed at the end of said tubular member opposite said diaphragm being substantially filled with said fluid, and forming a contiguous sealed fluid filled chamber with said tubular member.

3. Apparatus as recited in claim 1 wherein said electrical contact is disposed on the side of said diaphragm opposite said fluid.

4. Apparatus as recited in claim 2 wherein said variable volume fluid supply means comprises an expansion bellows.

5. Apparatus as recited in claim 1 wherein said fluid is a high density oil.

6. Apparatus as recited in claim 1 wherein said diaphragm is convex with respect to the end of said tubular member.

7. Apparatus as recited in claim 1 further including
spring return means disposed on the electrical contact side of said diaphragm,
whereby upon the reduction below said predetermined magnitude of acceleration forces acting along the longitudinal axis of said tubular member said diaphragm is returned to its uncollapsed position.

8. Apparatus as recited in claim 2 further including
means selectively operative to impart a force of predetermined magnitude on said variable volume fluid supply means,
whereby said switch may be tested as to its response to applied acceleration.

9. Apparatus as recited in claim 8 wherein said force imparting means comprises a solenoid constructed and disposed such that, when activated, the plunger thereof engages said variable volume fluid supply means with a preselected force.

10. An improved single-pole, double-throw linear acceleration switch comprising
a fluid tubular member,
an electrically conductive collapsible diaphragm, and
first and second electrical contacts,
said fluid filled tubular member
being sealed at one end by said diaphragm, and
being coupled at its opposite end to a variable volume fluid supply means forming a contiguous sealed fluid filled chamber therewith,
said first electrical contact being disposed in a fixed position relative to said diaphragm such that in its uncollapsed position said diaphragm engages said first contact, and
said second electrical contact being disposed in a fixed position relative to said diaphragm on the side thereof opposite said first contact such that said diaphragm when collapsed engages said second contact,
whereby acceleration forces of predetermined magnitude acting on said switch along the longitudinal axis of said tubular member cause sufficient fluid pressure to collapse said diaphragm thus disengaging said first contact and engaging said second contact.

11. Apparatus as recited in claim 9 wherein said variable volume fluid supply means comprises an expansion bellows.

12. Apparatus as recited in claim 10 wherein
said diaphragm
   in its uncollapsed position is of a configuration which is convex with respect to the end of said tubular member, and
   in its collapsed position is of a configuration which is concave with respect to the end of said tubular member.

13. Apparatus as recited in claim 10 further including spring return means disposed on the second electrical contact side of said diaphagm
whereby upon the reduction below said predetermined magnitude of acceleration forces acting along the longitudinal axis of said tubular member said diaphragm is returned to its uncollapsed position.

14. Apparatus as recited in claim 10 further including means selectively operative to impart a force of predetermined magnitude on said variable volume fluid supply means
whereby said switch may be tested as to its response to applied acceleration.

15. Apparatus as recited in claim 14 wherein said force imparting means comprises a solenoid constructed and disposed such that when activated the plunger thereof engages said variable volume fluid supply means with a preselected force.

References Cited

UNITED STATES PATENTS

| | | | |
|---|---|---|---|
| 2,596,171 | 5/1952 | Rabinow | 102—70.2 |
| 3,008,334 | 11/1961 | Lees. | |
| 3,018,664 | 1/1962 | Humble | 200—61.53 |
| 3,141,936 | 7/1964 | Boyle et al. | 200—61.53 |
| 3,257,529 | 6/1966 | Lindberg | 200—83 |
| 3,398,991 | 8/1968 | Compton | 200—61.45 XR |

FOREIGN PATENTS 1,286,785    1/1962    France.

ROBERT K. SCHAEFER, Primary Examiner

M. GINSBURG, Assistant Examiner

U.S. Cl. X.R.

73—515; 200—83